United States Patent [19]
Böhmer

[11] Patent Number: 5,211,464
[45] Date of Patent: May 18, 1993

[54] ILLUMINATING DEVICE, PARTICULARLY FOR DISPLAYS OF DATA PROCESSING DEVICES

[75] Inventor: Christian Böhmer, Nürnberg, Fed. Rep. of Germany

[73] Assignee: Ta Triumph-Adler, Nürnberg, Fed. Rep. of Germany

[21] Appl. No.: 858,692

[22] Filed: Mar. 27, 1992

[30] Foreign Application Priority Data

Mar. 30, 1991 [DE] Fed. Rep. of Germany ....... 4110503

[51] Int. Cl.$^5$ ............................................. F24V 7/04
[52] U.S. Cl. ............................................. 362/31
[58] Field of Search ............................ 362/31, 26, 27

[56] References Cited

U.S. PATENT DOCUMENTS

| 2,358,203 | 9/1944 | Best | 362/31 |
| 3,497,686 | 2/1970 | Young | 362/31 |
| 5,055,978 | 10/1991 | Rogoff | 362/26 |

FOREIGN PATENT DOCUMENTS 803147  3/1951  Fed. Rep. of Germany ........ 362/31

*Primary Examiner*—Carroll B. Dority
*Attorney, Agent, or Firm*—Michael J. Striker

[57] ABSTRACT

An illuminating device has a bar-shaped light, a light conductor plate and a U-shaped clamping part having two legs. The clamping part extends along the bar-shaped light and connects the light with the light conductor plate so that the clamping part embraces the light and a neighboring edge region of the light conductor plate in a U-shaped manner and the legs are elastically fixed on the light conductor plate.

6 Claims, 1 Drawing Sheet

ILLUMINATING DEVICE, PARTICULARLY FOR DISPLAYS OF DATA PROCESSING DEVICES

BACKGROUND OF THE INVENTION

The present invention relates to an illuminating device including a bar-shaped light and a light conducting plate, especially for displays of data processing devices.

Such illuminating devices for example for displays of so-called laptops, are conventionally formed so that the light is connected with the light conductor plate by screwing, welding and by frame structures. The known solutions do not allow any tolerance compensation in the event of measuring tolerances and require a relatively expensive mounting of the light.

SUMMARY OF THE INVENTION

Accordingly, it is an object of the present invention to provide an illuminating device of the above mentioned type, which avoids the disadvantages of the prior art.

More particularly, it is an object of the present invention to provide an illuminating device of the above mentioned type which compensates tolerances and provides for a simple and fast mounting of the bar-shaped light on the light conductor plates and a simple light exchange for services.

In keeping with these objects and with others which will become apparent hereinafter, one feature of the present invention resides, briefly stated, in an illuminating device in which a bar-shaped light is form-lockingly fixed on a housing part and connected with a light conductor plate by a clamping part extending along the bar-shaped light, so that the clamping part embraces the light at a neighboring edge region of the light conductor plate in a U-shaped manner, and the U-legs are fixed elastically on the light conductor plate.

Thereby a mounting of a small part of structural elements is possible with small size of the total arrangement. The clamping part is for example composed of a steel sheet. The light is first fixed form-lockingly on the housing part and thereby fixed in its relative distance from the light conductor plate. By setting on the clamping part, the light is connected with the light conductor plate and also oriented in direction perpendicular to the plate plane. Due to the springy abutment, a type of a flexible bearing is obtained, which makes possible the compensation of tolerance.

In accordance with a further embodiment of the invention, holding tongues are arranged on the U-legs of the clamping part and project from its plane. They engage in holding recesses of the light conductor plate. Thereby due to elastic holding forces, a displacement of the light conductor plate relative to the clamping part is prevented.

An especially exact seat is obtained when the holding recesses of the light conductor plate have an inclined surface and a substantially vertical abutment surface, while a part of the holding tongues extends in direction from the lights and a part extends in direction of the light so that, during arresting in the corresponding holding recesses, the free end sides of the holding tongues come to abutment both in direction to the light and from the light against the abutment surfaces of the holding recesses.

Despite the reliable orientation provided by it, the holding tongues can be released without problems by simple slight bending.

The form-locking housing-side fixation of the light is obtained in a simplest manner when it is arranged at its both ends in respective upwardly open U-shaped recesses. The corresponding housing-side holding part is located in the placed condition of the clamping part, at both sides outside the same.

It is advantageous when the light conductor plate with its longitudinal edge located opposite the bar-shaped light abuts against housing-side abutments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
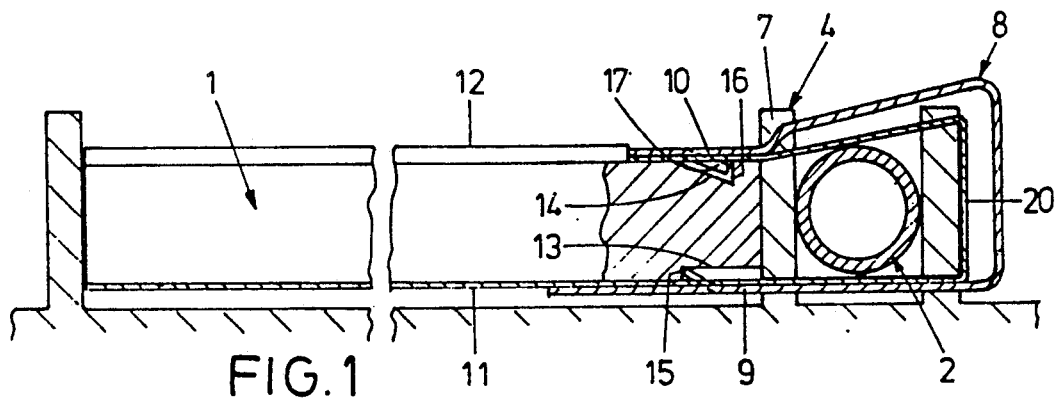
FIG. 1 is a view showing a section taken perpendicular to the plane of a light conductor plate of an illuminating device in accordance with the present invention.
Figure 2:
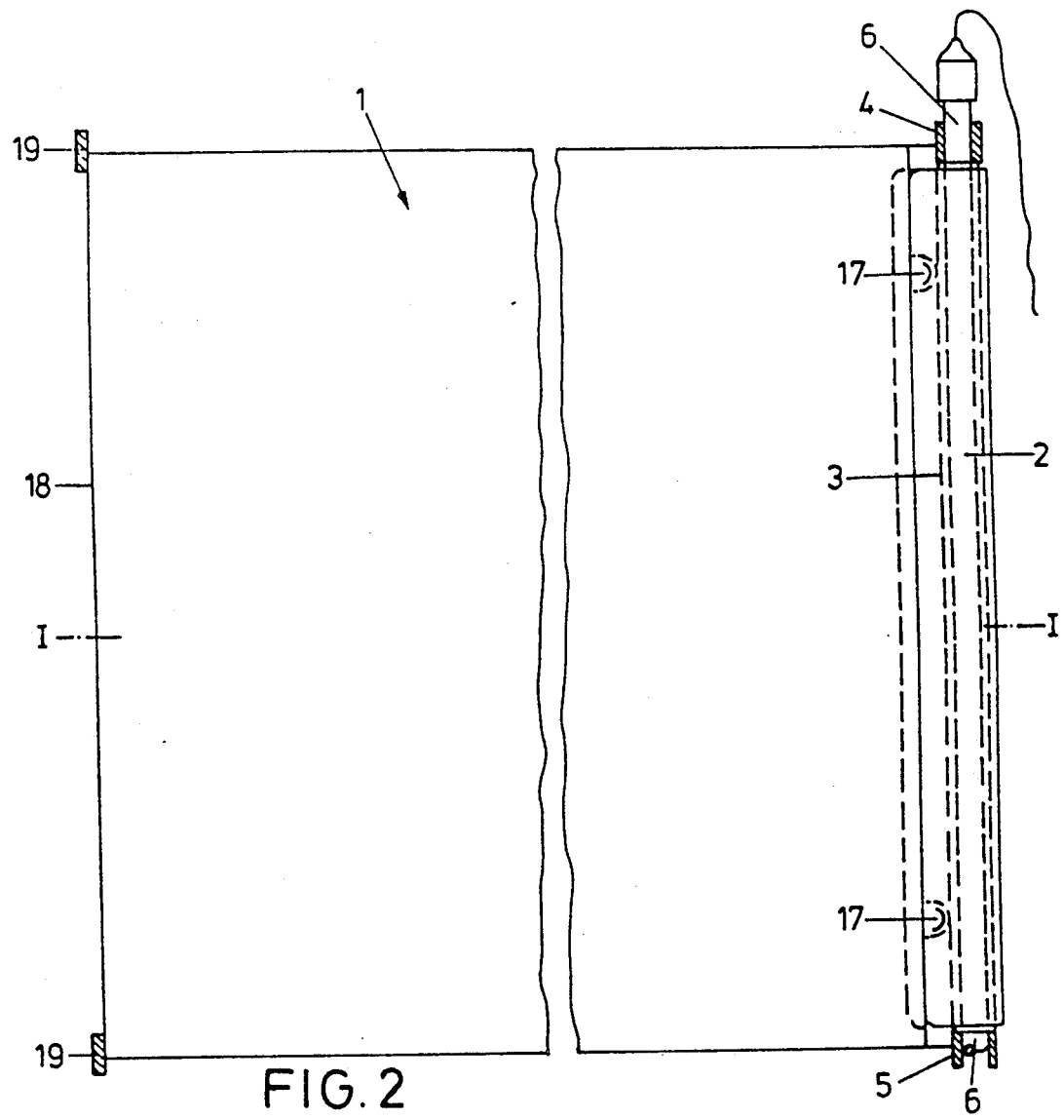
FIG. 2 is a plan view of the illuminating device of FIG. 1 in accordance with the present invention.

An illuminating device shown in the drawings has a light conductor plate 1 which is formed in a known manner of several layers. Their illustration in greater detail is believed not to be needed. A bar-shaped light 2 extends parallel to one longitudinal edge 3 of the light conductor plate 1.

Holding parts 4 and 5 are provided at a housing. They have a U-shaped cross-section, so that free outer ends 6 of the light 10 can be form-lockingly received in a recess of each holding part. An inwardly located leg 7 of the U-shaped part 4, 5 serves simultaneously as an abutment for the light conductor plate 1. Therefore, the light conductor plate 1 extends parallel to the light 2 with a definite distance from it, corresponding to the width of the leg 7.

The device further has a clamping part 8 which is composed of a steel sheet and bent to assume a U-shape. The clamping part is arranged so that it embraces the light 2 perpendicularly to its longitudinal axis and is fittable on the region of the light conductor plate 1 which is close to the longitudinal edge 3. Free ends of legs 9 and 10 of the U-shaped clamping part 8 electrically abut on a lower side 11 and on an upper side 12 of the light conductor plate 1.

The light conductor plate further has holding recesses 13 and 14 having at least one vertical abutment surface 15 and 16 respectively. The legs 9 and 10 of the clamping part 8 have holding tongues 17 which are punched in a U-shaped manner and bent inwardly. The holding tongues 17 engage in the holding recesses 13 and 14 and abut with their free ends against the abutment surfaces 15 and 16. The abutment surfaces 15 and 16 are located opposite to one another on the upper side and the lower side of the light conductor plate 1 and the holding tongues are also bent opposite to one another. Therefore, after fitting of the holding clamp 8, a fixing both in direction to the left due to the abutment surface 15 on the lower side, and also in direction to the right due to the abutment surface 16 on the upper side of the plate is provided.

The light conductor plate has a longitudinal edge 18 which is opposite to the longitudinal edge 3. The longitudinal edge 18 abuts against abutments 19 which extend parallel to the longitudinal edge 18 and provided at the side of the housing.

It is therefore believed to be understood that the light 2 and the light conductor plate 1 can be connected with one another by the clamping part 8 in a simplest manner. A reflection foil 20 which embraces the light 2 can also be connected with these parts in the same manner. An exchange of the light 10 can be performed without problems. The connection can function also when certain tolerances must be compensated.

It will be understood that each of the elements described above, or two or more together, may also find a useful application in other types of constructions differing from the types described above.

While the invention has been illustrated and described as embodied in an illuminating device, particularly for displays of data processing devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An illuminating device, comprising a bar-shaped light; a light conductor plate; and a U-shaped clamping part having two legs, said clamping part extending along said bar-shaped light and connecting said light with said light conductor plate so that said clamping part embraces said light and a neighboring edge region of said light conductor plate in a U-shaped manner and said legs are elastically fixed on said light conductor plate, said clamping part having a first engaging formation provided on said legs, said light conductor plate having second engaging formations formed so that said first engaging formations engage with said second engaging formations, one of said first and second engaging formations being a projection, while another of said first and second engaging formations is a groove in which said projection engages.

2. An illuminating device, comprising a bar-shaped light; a light conductor plate; a U-shaped clamping part having two legs, said clamping part extending along said bar-shaped light and connecting said light with said light conductor plate so that said clamping part embraces said light and a neighboring edge region of said light conductor plate in a U-shaped manner and said legs are elastically fixed on said light conductor plate, said bar-shaped light having two ends; and means forming a U-shaped recess provided at each of said ends and receiving a respective one of said ends.

3. An illuminating device, comprising a bar-shaped light having two ends; a light conductor plate having a longitudinal edge which is spaced from said light; a U-shaped clamping part having two legs, said clamping part extending along said bar-shaped light and connecting said light with said light conductor plate so that said clamping part embraces said light and a neighboring edge region of said light conductor plate in a U-shaped manner and said legs are elastically fixed on said light conductor plate; means forming a U-shaped recess provided at each of said ends and receiving a respective one of said ends of said light; and means forming abutment members provided in said housing so that said longitudinal edge of said plate abuts against said abutment members.

4. An illuminating device, comprising a bar-shaped light; a light conductor plate; and a U-shaped clamping part having two legs, said clamping part extending along said bar-shaped light and connecting said light with said light conductor plate so that said clamping part embraces said light and a neighboring edge region of said light conductor plate in a U-shaped manner and said legs are elastically fixed on said light conductor plate, said clamping part having a first engaging formation provided on said legs, said light conductor plate having second engaging formations formed so that said first engaging formations engage with said second engaging formations.

5. An illuminating device, comprising a bar-shaped light; a reflecting foil; a light conductor plate; and a U-shaped clamping part having two legs, said clamping part extending along said bar-shaped light and connecting said light with said light conductor plate so that said clamping part embraces said light, said reflecting foil and a neighboring edge region of said light conductor plate in a U-shaped manner and said legs are elastically fixed on said light conductor plate; and a housing provided with a plurality of projections spaced from one another to receive said bar-shaped light, and said light conductor plate.

6. An illuminating device as defined in claim 1, wherein each of said engaging grooves has a substantially vertical abutment surface, one of said engaging projections extending in a direction away from said light, while another of said engaging formations extend in direction toward said light, so that when said engaging formations engage in said engaging grooves they abut against said abutment surfaces to prevent a displacement of said light relative to said light conductor plate both in the direction away of said light and in a direction towards said light.

* * * * *